M. V. Nobles,
Knob Attachment.
Nº 48,025. Patented May 30, 1865.
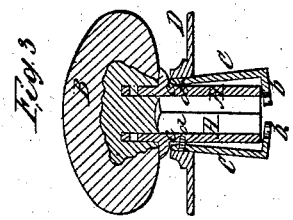
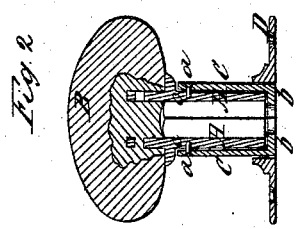 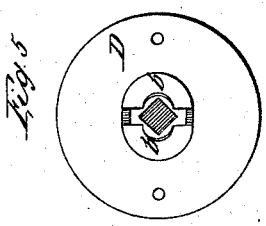
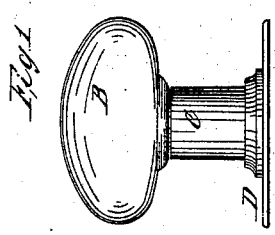 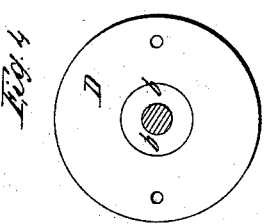
Witnesses
Jno D. Patton
Thos. J. Chamberlain
Inventor
Milton V. Nobles
By atty A. B. Stoughton

UNITED STATES PATENT OFFICE.

MILTON V. NOBLES, OF ROCHESTER, ASSIGNOR TO HIMSELF AND JOHN C. NOBLES, OF RUSHFORD, NEW YORK.

IMPROVEMENT IN FASTENING DOOR-KNOBS TO THEIR SHANKS.

Specification forming part of Letters Patent No. 48,025, dated May 30, 1865.

*To all whom it may concern:*

Be it known that I, MILTON V. NOBLES, of Rochester, in the county of Monroe and State of New York, have invented certain new and useful Improvements in the Manner of Fastening Door and other Knobs to their Shanks; and I do hereby declare that the following is a full, clear, and exact description of the same, reference being had to the accompanying drawings, making a part of this specification, in which—

Figure 1 represents an outside view of the knob and fastening. Fig. 2 represents a section through the same as it appears when united to the shank. Fig. 3 represents a section through the knob and hub as it appears when detached from the shank. Fig. 4 represents an end view when closed, and Fig. 5 a similar view when the jaws are open.

Similar letters of reference, where they occur in the separate figures, denote like parts in all cases.

My invention consists in the combined use of a solid hub, a split sleeve or boss, and a sliding ring or plate for the purpose of connecting and disconnecting a knob and shank.

To enable others skilled in the art to make and use my invention, I will proceed to describe the same by reference to the drawings.

The hub A and knob B may be made and united in any of the usual well-known ways. The hub has a square opening in it for the shank, as is common in such cases, and I call it a "solid" hub to distinguish it from a split hub. On the outside of the hub A, I arrange a split sleeve or boss, C, the sections of which are pivoted at $a$ to the hub, and the inner rear surface of which is beveled off, as shown at $c$, so that the front ends of the sections, which have projections, flanges, or jaws $b\ b$ on them, may open when the ring or plate D is run back, as shown in Fig. 3. I prefer to use as the ring for opening and closing the sections, so as to release or to hold the shank, the rose D, which is always used with the knob; but a separate ring may be used for the purpose, instead of or in addition to the rose. When the rose is run down, as shown in Figs. 1, 2, and 4, the hub and knob are firmly held to the shank by the jaws $b\ b$ taking into a groove or recess in the shank. When the rose is run back, as in Figs. 3 and 5, the jaws are opened and the knob is free to be slipped from the shank.

Having thus fully described my invention, what I claim as a means of fastening a door-knob to its shank is—

The combined use of a split sleeve and a ring or ordinary rose-plate with the hub and shank, substantially as herein described and represented.

M. V. NOBLES.

Witnesses:
   A. B. STOUGHTON,
   J. C. NOBLES.